(12) United States Patent
Mesarina et al.

(10) Patent No.: US 7,937,167 B1
(45) Date of Patent: May 3, 2011

(54) METHODOLOGY TO PROGRAM SENSORS INTO COLLABORATIVE SENSING GROUPS

(75) Inventors: Malena Mesarina, San Francisco, CA (US); Devaraj Das, Ft. Collins, CO (US); John Recker, Mountain View, CA (US)

(73) Assignee: Hewlett-Packard Development Company L. P., Houston, TX (US)

( * ) Notice: Subject to any disclaimer, the term of this patent is extended or adjusted under 35 U.S.C. 154(b) by 390 days.

(21) Appl. No.: 11/503,598

(22) Filed: Aug. 12, 2006

(51) Int. Cl.
*G05B 11/01* (2006.01)
(52) U.S. Cl. ....... 700/78; 700/19; 370/254; 340/870.11; 340/870.16
(58) Field of Classification Search .................... 700/78, 700/9, 19; 702/150
See application file for complete search history.

(56) References Cited

U.S. PATENT DOCUMENTS

| 2004/0018839 | A1* | 1/2004 | Andric et al. ................. 455/433 |
| 2007/0005292 | A1* | 1/2007 | Jin ................................. 702/150 |
| 2007/0019569 | A1* | 1/2007 | Park et al. ..................... 370/254 |

OTHER PUBLICATIONS

Pedro Jose Marron et al. "Tinycubus: An Adaptive Cross-Layer Framework for Sensor Networks", IT—Information Technology, vol. 47 (2), , 2005 pp. 87-97. Oldenbourg Wissenschaftuerlag, Munich, Germany.
Kay Romer et al. Generic Role Assignment for Wireless Sensor Networks. In Proceedings of the 11th ACM SIGOPS European Workshop, Leuven, Belgium, Sep. 2004, pp. 7-12. ACM Press, New York, NY.
Kamin Whitehouse et al. "Hood: A Neighborhood Abstraction for Sensor Networks," in Proceedings of the Second International Conference on Mobile Systems, Applications, and Services (Mobisys, 2004), Boston, Massachusetts, pp. 99-110. ACM Press, New York, NY.
Matt Welsh end Geoff Mainland. "Programming Sensor Networks Using Abstract Regions," in Proceedings, $1^{st}$ Symposium on Networked Systems Design and Implementation (NSDI, 2004), San Francisco, California, pp. 29-42. ACM Press, New York, NY.
Jan Steffan et al. Scoping in Wireless Sensor Networks. In Intl Workshop on Middleware for Pervasive and Ad-Hoc Computing (MPAC '04), Oct. 2004, Toronto, Canada, pp. 167-171. ACM Press, New York, NY.

* cited by examiner

*Primary Examiner* — Kidest Bahta
*Assistant Examiner* — Nathan Laughlin

(57) ABSTRACT

Embodiments of the invention employ a distributed algorithm to enable sensor nodes in a sensor network to adaptively self-configure into sensor clusters to provide a desired higher-level functionality.

20 Claims, 7 Drawing Sheets

| RULE TYPE | FORMAT |
|---|---|
| SENSOR RULE | <sensor_type> <location> <cluster_id><br>312　　314　　316 |
| ANCESTOR RULE | <sensor_type> <prev_sensortype> <next_sensortype> <cluster_id><br>322　　324　　326　　328 |

| FORMAT |
|---|
| 410　420　430　440　450<br><hop> <node_id> <sensortype> <location> <list_of_shortest_path_nodes> |

| FORMAT |
|---|
| 510　520　530　540　550<br><cluster_id> <sensortype> <location> <master> <members> |

METHODOLOGY TO PROGRAM SENSORS INTO COLLABORATIVE SENSING GROUPS

BACKGROUND OF THE INVENTION

The present invention relates generally to programming sensors into collaborative sensing groups.

The commoditization of hardware and recent developments in middleware software for wireless sensor networks (WSN) have made it possible for these systems to find practical use. There are substantial advantages to using wireless sensor networks over traditional sensor systems. Wireless systems require no manual wiring installation, enabling ad-hoc and scalable deployment of sensors. In addition, the presence of intelligent nodes enables in-situ processing for faster local reactions. From manufacturing to supply chain, there are several industries that can benefit from WSN. In general, these environments have traditionally used fixed wiring sensing infrastructures with centralized data and command control. These centralized systems lack flexibility in deployment, real-time data processing, and the fast reactive capabilities of WSN. In addition, a centralized system makes it difficult to scale in the number of sensors because of lack of bandwidth at the central point of data collection. Wireless sensors networks could replace these centralized systems. However, unless they are demonstrably easier to program and maintain than existing solutions, they will not be widely used.

Some of the challenges in programming wireless sensor networks arise from the need for sensor nodes to adapt their behavior to changes in context. How a node processes sensor data and interacts with other sensor nodes may depend on the sensor types present in the network and their location. For example, in a pallet tracking radio-frequency identification (RFID) system for warehouses, composed of motion sensors and RFID readers which read RFID tags (e.g., microchips that listen for a radio query and respond by transmitting their unique ID code), the behavior of the sensors will vary depending on sensor type and location. In these systems, RFID readers and motion sensors are deployed in groups at entry doors to read RFID tags (via RFID readers) of products passing through the door (detected by a motion sensor). Depending on whether the motion sensor is present or not, two behaviors are desirable. The optimal behavior is to activate the RFID readers only when the motion sensor detects an object in its line of sight, so as to minimize spurious reads. If the motion sensor breaks or is removed, the second best behavior is to continuously trigger the read cycles of the RFID readers, minimizing the possibility that a product may be missed. This example shows that a change in sensors requires a change in behavior. Re-programming the sensors every time there is a change in context, however, is neither practical nor feasible, especially when the number of sensors is large.

It would be desirable to have a technique which allows sensors of a sensor network to automatically form clusters based on sensor attributes such as sensor type and sensor location, and which allows automatic reprogramming triggered by changes in network context.

SUMMARY OF THE INVENTION

An embodiment of sensor node of a sensor network may include one or more sensors each characterized by associated sensor attributes; a set of cluster rules defining formation of a cluster, each cluster rule defining a set of cluster membership attributes and corresponding cluster membership attribute values required of a sensor for membership in the cluster; a cluster formation function which forms a given cluster comprising the sensors characterized by the sensor attributes with corresponding sensor attribute values specified by at least one of the cluster rules and which programs at least one sensor of the given cluster to perform a respective function associated with its sensor attribute value of a given sensor attribute that is common to all sensors in the given cluster.

An embodiment of a method for programming clusters of collaborative sensors in a sensor network of nodes, each node comprising processing means and one or more sensors each characterized by associated sensor attributes may include obtaining a set of cluster rules defining formation of a cluster, each cluster rule defining a set of cluster membership attributes and corresponding cluster membership attribute values required of a sensor for membership in the cluster; forming a given cluster comprising the sensors characterized by the sensor attributes with corresponding sensor attribute values specified by at least one of the cluster rules; and for at least one sensor of the given cluster, effecting execution of a respective function associated with its sensor attribute value of a given sensor attribute that is common to all sensors in the given cluster.

An embodiment of a sensor network system may include at least one sensor node, each sensor node comprising one or more sensors each having associated sensor attributes, a set of cluster rules defining formation of a cluster, each cluster rule defining a set of cluster membership attributes and corresponding cluster membership attribute values required of a sensor for membership to the cluster, a cluster formation function which forms a given cluster in accordance with the set of cluster rules to include as cluster members of the given cluster each of the one or more sensors having sensor attributes and corresponding sensor attribute values that match the set of cluster membership attributes and corresponding predefined cluster attribute values defined by any of the cluster rules in the set of cluster rules, a set of behavior scripts, each associated with a different cluster membership attribute value of one of the cluster membership attributes that is common to all member sensors of the given cluster, a behavior spawning function which, for each sensor in the given cluster, effects execution of the behavior script associated with the cluster membership attribute value specific to sensor attribute value of the corresponding sensor attribute of the sensor, a hop table which stores information concerning sensor types and corresponding host node information of sensors in the sensor network, and a hop table updating function which detects changes in nodes of the sensor network and updates the information in the hop table to reflect the detected changes.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Figure 1:
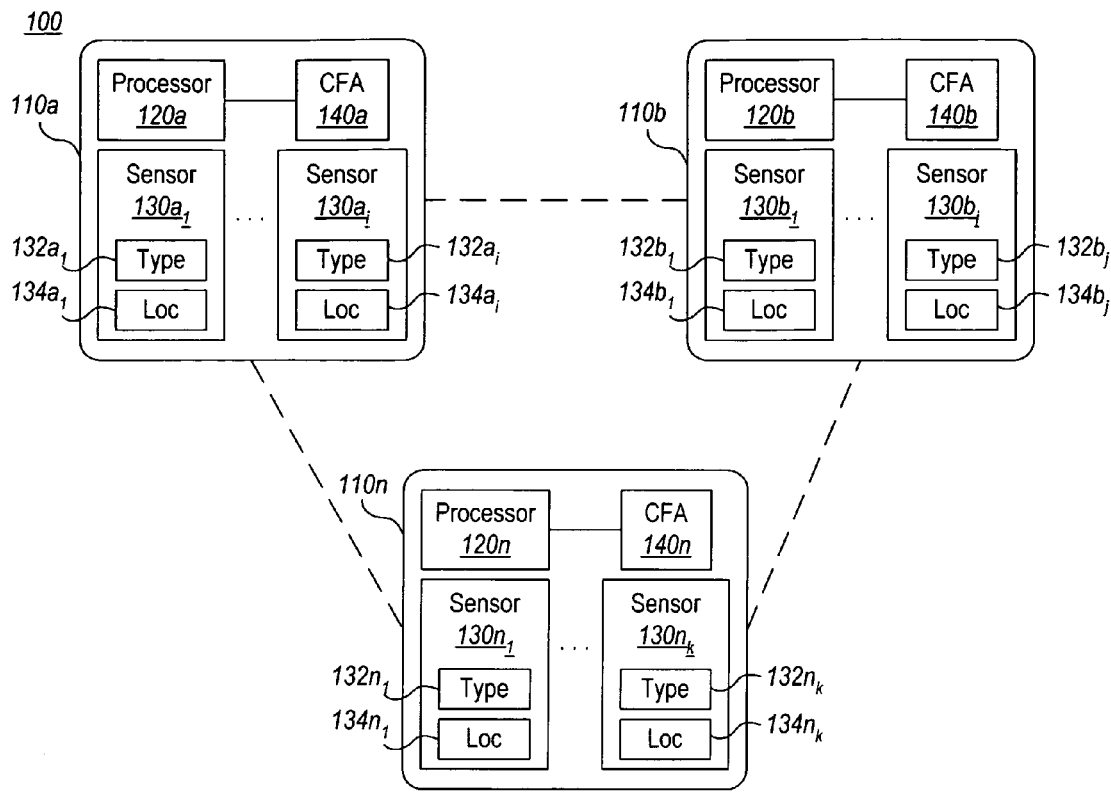
FIG. 1 is a block diagram of a sensor network.

For simplicity and illustrative purposes, the principles of the embodiments are described. Moreover, in the following detailed description, references are made to the accompanying figures, which illustrate specific embodiments. Electrical, mechanical, logical and structural changes may be made to the embodiments without departing from the spirit and scope of the embodiments.

Embodiments of the invention employ a distributed algorithm to enable wireless sensor nodes to discover each other and to adaptively self-configure into sensor clusters to provide a desired functionality. These clusters may be thought of as "virtual" sensors, since they represent an abstract functionality of the actual physical sensors. Embodiments of the algorithm are based on "rules" for clustering and "behavior" scripts. Rules prescribe the properties that a network node should have in order to be part of a given cluster, for example, sensor type and location. Behavior scripts comprise actual program code that a node should run to process data of a particular sensor type and interact with other sensors in the cluster. Rules and behavior scripts are disseminated to the nodes in a sensor network, and the algorithm executing on each node finds all the cluster formations in the network that match those rules. Periodically, each node checks its sensors and location, and compares them against the rules to determine whether to spawn or kill behavior scripts, making the system adaptive. In addition, the system is scalable since newly discovered nodes are automatically loaded with the algorithm, rules, and behavior scripts by neighboring nodes.

In one embodiment, the algorithm runs as a script in a sensor network middleware software, for example Sensorware, an Open Source software package available on the Internet at www.sourceforge.net, which provides basic communications as well as script spawning and migration capabilities.

Embodiments of the invention (1) simplify the task of programming, enabling programming in the large since only one single injection of the rules and scripts is sufficient to trigger the formation of "virtual sensors", (2) enable adaptive behavior by spawning the appropriate sensor scripts when changes occur, and (3) make the system scalable, since any new node is automatically programmed by neighboring nodes.

As defined herein, a sensor is a device operable to measure or respond to a physical stimulus or control signals. A node is any combination of sensors and at least one processor (which may include any type of processing means for executing program instructions) connected to a network and addressed as a single entity. A sensor network is a network of nodes that may communicate with one another by way of the network. A cluster (also referred to herein in as a "virtual sensor" in places for better understanding), comprising a set of sensors that represents an abstract functionality (or global task) of actual physical sensors. To spawn, means to place a script or program into a run mode.

FIG. 1 is a block diagram of a sensor network 100. The sensor network 100 includes a plurality of nodes 110 (shown as 110a, 110b, 110n). The node addresses are mutually exclusive.

Each node comprises at least one sensor 130 (shown as $130a_1$, $130a_j$, $130b_1$, $130b_j$, $130n_1$, $130n_k$). The sensors 130 at each node 110 may be of different sensor types (e.g., RFID reader, camera, motion sensor, temperature sensor, solar detector, etc.), and the types of sensors may differ from node to node. Each sensor 130 may be defined by a sufficient number of attributes to uniquely identify it (e.g., sensor type, serial number, etc.) and host node information (e.g., location, node address, etc.). For example, node 110a may include a temperature sensor $130a_1$ and an RFID reader $130a_j$, while node 110b may include a temperature sensor $130b_1$ and a motion sensor $130b_j$, and node 110n may include an RFID reader $130n_1$ and a motion sensor $130n_k$. Furthermore, for example, all sensors $130a_1$, $130a_j$, of node 110a may be located in a location known as "Aisle A", while all sensors $130b_1$, $130b_j$, of node 110b may be located in a location known as "Aisle F", and all sensors $130n_1$, $130n_k$, of node 110n may be located in a location known as "Aisle C".

Each node 110 also includes a processor 120 (shown as 120a, 120b, 120n) that is configured to execute a local cluster formation algorithm 140 (shown as 140a, 140b, 140n). The cluster formation algorithm 140 has two objectives: a) to find a set of nodes whose sensor types and location match certain properties and organize them into a cluster that is organized into an hierarchy of groups, and b) to load and run the appropriate behavior script for a sensor.

A cluster comprises a set of sensors that together represents an abstract functionality (or global task) of actual physical sensors. In any given sensor network, there may be different clusters (or "virtual sensors") that have the same physical sensors, but represent different functionalities. For example, a sensor network could have two virtual sensors: a "dock door" virtual sensor and an "object tracker" virtual sensor. The "dock door" virtual sensor may use a motion sensor and three RFID readers to behave as a dock door that detects RFID tags from pallets coming through a dock door. The "object tracker" may use one RFID reader, four motion sensors and four cameras to trace the movement of an object in a room. It may use a motion sensor and RFID reader to detect when the object with a tag enters the room, and the RFID reader can then trigger cameras to follow the object inside the room. In both virtual sensors, motion sensors and RFID readers are used, but the behavior of these sensors are different because the global task they are to accomplish is different.

A cluster may be defined by a set of cluster rules. A cluster rule defines one or more attributes requirements that a sensor must have in order for the sensor to be a member of the cluster. In one embodiment, at least one attribute comprises a sensor type. In one embodiment, at least one attribute comprises a sensor location. Within a given cluster, sensors may be grouped according to attributes. For example, sensors of a given cluster may be grouped according to sensor type as long as at least one attribute of the cluster rule is the sensor type. For example, a cluster rule can describe three sets of sensor and location attributes with a fixed sensor type hierarchy, such as "all temperature sensors in aisle A, all temperature sensors in aisle F and all RFID readers in aisle C form cluster X, where the temperature sensors form a level 0 group and the RFID readers form a level 1 group". The group level designates a sensor's position in the data flow hierarchy which, as explained later, is used to set the direction of data flow in the cluster. In this example, cluster X would include temperature sensor $130a_1$ of node $110a$, temperature sensor $130b_1$ of node $110b$, and RFID reader $130n_1$ of node $110n$.

Figure 2:
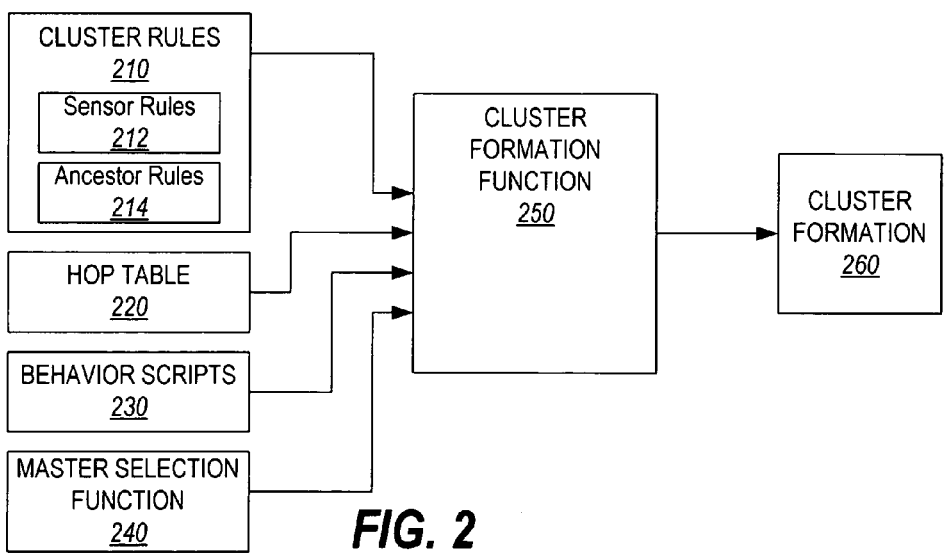
FIG. 2 is a block diagram of the components of an embodiment of a cluster formation algorithm.

FIG. 2 is a block diagram of the components of an embodiment of a cluster formation algorithm 200. The algorithm 200 includes a cluster formation function 250 which uses four main components during its execution: cluster rules 210, a hop table 220, behavior scripts 230, and a master selection function 240. The cluster rules 210 describe sets of sensor and location attributes for cluster formation (known as "sensor rules", described hereinafter), and the hierarchy of the sensors in the cluster (known as "ancestor rules", described hereinafter). A behavior script 230 defines the processing and post-processing interaction of a sensor with other cluster members and is defined for each sensor type in the cluster. The hop table 220 is a data structure, locally maintained by all nodes 110, in which each sensor 130 in the network 100 has an entry containing attributes of the sensor (e.g., sensor type) and host node information (e.g., node id, location). The master selection function 240, which is used when a cluster is divided into such groups of sensors to impose order, selects a master out of a group of sensors of the same type and location in a cluster.

A more detailed discussion of each of the components 210, 220, 230, and 240, in turn, now follows, beginning with a discussion of the cluster rules 210. There are two types of rules—sensor rules 212 and ancestor rules 214. Sensor rules 212 describe the sensor types 132 and location 134 attributes (see FIG. 1) required for cluster membership.

An ancestor rule specifies the sensor type from which data should be received and the sensor type to which data is to be sent. Ancestor rules 214 therefore operate to fix an hierarchy between sensor types. Specifically, the hierarchy established by the ancestor rules fixes the path of data exchange between sensor groups in the cluster.

Figures 3, 4, 5, 6:
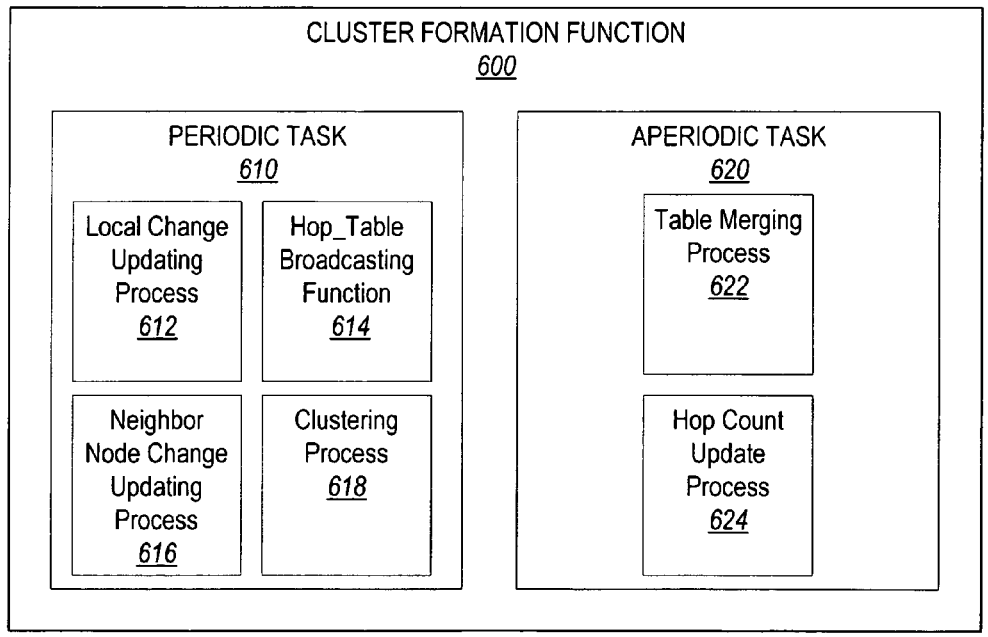
FIG. 3 is an embodiment of a format a sensor rule.
FIG. 4 is an embodiment of a format a hop table.
FIG. 5 is an embodiment of a format of a cluster table.
FIG. 6 is a block diagram of an embodiment of a cluster formation function.

FIG. 3 is a table 300 illustrating the format for an embodiment of the sensor rules 212 (embodied as sensor rule 310) and ancestor rules 214 (embodied as ancestor rule 320). A sensor rule 310 has three elements: sensor type (sensortype) 312, sensor location (location) 314, and virtual sensor type (virtual_sensor_type) 316. The cluster formation algorithm 140 uses the virtual sensor type 316 to differentiate between clusters—that is, to differentiate between "virtual sensors" that use the same physical sensor types. An example of a sensor rule 310 is <RFID> <door A> <dock-door>, which means that all RFID readers in the "door A" location are part of a virtual sensor of type "dock-door".

An ancestor rule 320 has four elements: sensor type (sensortype) 322, previous sensor type (prev_sensortype) 324, next sensor type (next_sensortype) 326, and virtual sensor type (virtual_sensor_type) 328. The previous sensor type 324 and next sensor type 326 describe the sensor type that a master node is allowed to receive data from, and send data to, respectively. An example of an ancestor rule is <RFID> <motion_sensor> <camera> <dock-door>, which means that an RFID reader that is part of a virtual sensor of type "dock-door" can only receive messages from a motion sensor and can only send messages to a camera.

The combined application of the sensor rules 310 and ancestor rules 320 associated with a given virtual sensor type completely defines the organization of the nodes that form a cluster that represent this virtual sensor.

A hop table 220 is created and maintained by each node 110 and is used to compute the clusters in the network 100. Each entry in the hop table, as shown in an embodiment of a hop table 400 in FIG. 4, contains a hop count 410 (the distance in nodes to reach the source node of the entry), the node ID 420 of the source node, the sensor type 430, the node location 440, and a list 450 of the neighboring nodes in the shortest path to the source node (list_of_shortest_path_nodes). There may be multiple shortest paths to the source node. The list of shortest path nodes 450 maintains the node IDs of the neighbors in those paths. For illustrative purposes, there is only one entry per sensor type per node, which assumes that there can only be one of each kind of sensor in a node. This simplifies the type of information required to be maintained; however, if more than one sensor of the same type per node is needed, a new attribute (e.g., sensor serial number) may be added to the table to differentiate the sensors.

Behavior scripts 230 are the programs (executables or interpretable scripts) that define the data processing and collaboration between the sensors 130 in a cluster, and are specific to a sensor type of a virtual sensor type. For example, an RFID reader belonging to one cluster may operate to trigger a motion sensor upon detection of an RFID tag, whereas an RFID reader belonging to a different cluster may operate to trigger a camera upon detection of an RFID tag. Thus, the same sensor type behaves differently depending on which cluster it belongs to, and therefore operate according to different behavior scripts. Since these operations may be designed differently for a sensor depending on its role as a master or slave of its sensor group (discussed in more detail hereinafter), the behavior scripts 230 need to retrieve the sensor's role information from the cluster formation algorithm 200. In addition, information about the next ancestor in the hierarchy of sensor types is required for a master node to identify the next recipient master of its results.

In one embodiment, three application program interfaces (APIs) are defined for the cluster formation algorithm for a behavior script to retrieve this information. These are as follows:

| | |
|---|---|
| query_master <virtual_sensor_type> <sensor_type> <loc> | To request the id of the node that is the master for sensors of <sensor_type> in location <loc> of <virtual_sensor_type> |
| query_members <virtual_sensor_type> <sensor_type> <loc> | To request the id of the members of a group of sensors of type <sensor_type> in location <loc> of <virtual_sensor_type> |
| query_ancestor <virtual_sensor_type> <sensor_type> <loc> | To request the id of the next ancestor for sensor_type in <loc> of <virtual_sensor_type> |

The master selection function 240 selects one sensor from each group of similar sensors to act as the master sensor for the group. A cluster may be divided into such groups of sensors to impose order. A master sensor acts as the coordinator and data aggregator, with communications between sensor groups restricted to master nodes. The interaction between masters is restricted by a fixed order given by the ancestor rules 214. Because the master selection criteria may be application dependent, it may be included as a function in the behavior scripts 240. Thus, when the cluster formation algorithm 200 needs to select a master, it makes a call to the master selection function 240 of the appropriate sensor behavior script 230.

The cluster formation function 250 organizes the sensors into clusters. That is, the output of the cluster formation function 250 is the cluster formation 260, which is an organized system of sensors, divided into groups of nodes that share the same sensor type and location. Each group also has a selected master.

In one embodiment, the cluster formation 260 is stored in a cluster table. FIG. 5 shows an example embodiment of a cluster table 500. The virtual sensor type (virtual_sensor_type) 510 identifies the type of virtual sensor that the sensor node is part of (sensor type 520 specifies the sensor type for this group, the location 530 specifies the shared location of this group of sensors, master 540 contains the node id of the master node, and members 550 lists all the nodes in the group. All sensor groups with the same virtual sensor type are part of the same hierarchical cluster, whose hierarchy is specified by an ancestor rule identified by the same virtual sensor type.

In one embodiment of the cluster formation function 250, the following assumptions apply for simplicity of explanation of the operation of the function 250: 1) every broadcast of the hop_table 220 eventually reaches all neighbors of a node 110, and 2) every node 110 only hosts one of each type of sensor 130. The first assumption minimizes the number of broadcasts a node sends; however, in alternative embodiments, the broadcast may be performed periodically. The second assumption, as explained hereinafter, simplifies the table organization. A new attribute, however, may be added to the sensor rules 212 to distinguish sensors of the same type. The process of matching a rule's attributes to a node's attributes is independent of the type and number of attributes.

The cluster formation function 250 may be embodied as 600 shown in FIG. 6 to include a periodic task 610 and an aperiodic task 620. The periodic task 610 is responsible for updating local context changes in the node's local hop_table 220 and acting on them, while the aperiodic task 620 is responsible for merging the hop tables 220. Pseudo-code for the cluster formation function 250 can be found in the Appendix section. Line numbers of the pseudo-code are referred to throughout the coming section.

As shown in FIG. 6, in one embodiment, the periodic task 610 performs at least four operations, including: a) checking changes in local sensors and in local node's location (local change updating process 612), b) checking changes in the hop_table to broadcast the update (hop_table broadcasting function 614), c) checking the addition or removal of neighboring nodes (neighbor node change updating process 616), and d) forming the clusters (clustering process 618).

The local change updating process 612 checks for changes in the node's local sensors or location. If a new sensor 130 is discovered, the sensor information is added to the local hop_table 220 and a search for a cluster rule 210 that matches the sensor type and node's location is performed. If a match is found, the appropriate behavior script 230 for the sensor type is spawned (Appendix, lines 4-8). If a sensor has been removed, the corresponding behavior script is killed and the sensor removed from the local hop_table (Appendix, lines 9-12). If a new node location is sensed, then all behavior scripts that may be running are killed, and, for each sensor type, a rule that matches the sensor type and new node location is searched. If a match is found, then, the appropriate behavior script is spawned (Appendix, lines 14-22).

The cluster formation algorithm 140 is distributed. In this regard, a cluster formation algorithm (such as that embodied as 200 in FIG. 2) executes locally in all nodes 110 of the network 100. Typically, the algorithm 140 is executed periodically, but may also be executed on-demand.

Sensor and ancestor rules 210 are sent to all nodes 110 for them to store, pending an operation that triggers the clustering process.

Like the cluster rules 210, the behavior scripts 230 are sent to all the nodes 110. There is one behavior script 230 per sensor type for a virtual sensor type that is to be programmed and this assignment is also sent along with each script 220, for example according to the following format:

<sensor_type> <script Name> <virtual_sensor_type>

Each node 110 stores the cluster rules 210 and behavior scripts 230 to be utilized during the script spawning/killing operations of the clustering process.

The objective of the cluster formation algorithm 140 is to have all the nodes 110 in the network 100 share a global and consistent view of every node's sensing resources and locations, so that they can individually find the groups of nodes that share those attributes with them, whose attributes also match a cluster rule 210. If a node's attributes match those of a cluster rule 210, then the appropriate behavior scripts 230 for the node's sensor types are spawned.

As mentioned earlier, the hop table 220 is the data structure that carries the information about every node in the network. In one embodiment, the distribution mechanism use for propagating the hop table 220 is implemented according to the Distributed Bellman Ford (DBF) algorithm, which is well known in the art. In this implementation, every node 110 sends the information it has about all the nodes in the network (as contained in its local hop_table 220) to all its neighbor nodes, and the information is propagated from node to node, until all nodes 110 in the network 100 are updated.

Figure 7:
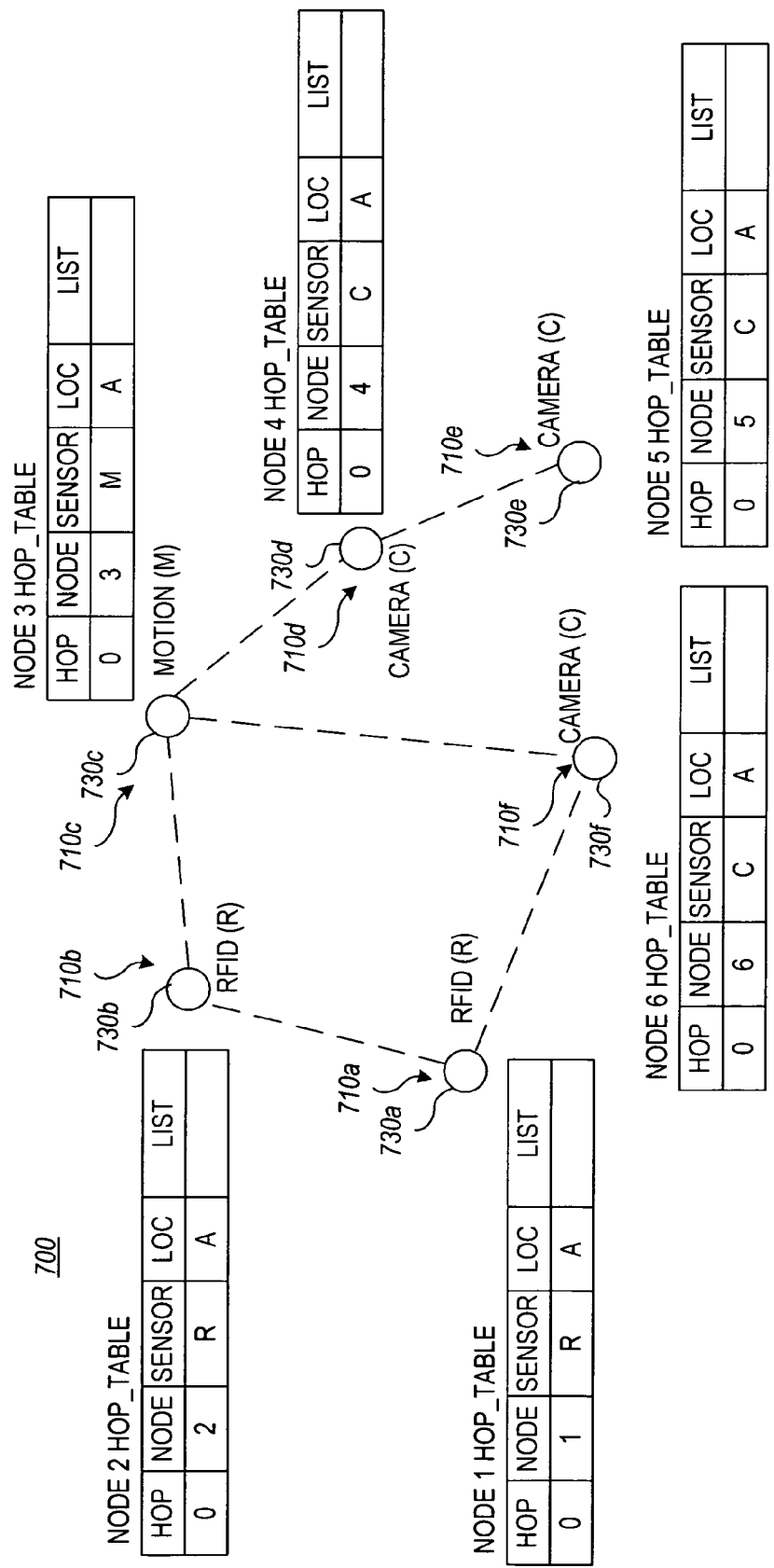
FIG. 7 shows a network diagram of an embodiment of a sensor network.

FIG. 7 shows a network diagram of a sensor network 700 comprising six nodes 710a, 710b, 710c, 710d, 710e, and 710f, each having a single respective local sensor RFID reader 730a, RFID reader 730b, motion sensor 730c, camera 730d, camera 730e, and camera 730f, respectively. The hardware and processing details of each node is implied, but not shown for simplicity of illustration. Also shown next to each node's sensor is the state of each node's local hop table 230 right after boot time, when the nodes have just discovered their own sensors and location. As shown, each node's local hop table is initialized with an entry describing itself. For example, the hop table of node 1 (710a) is initialized with an entry containing the information it knows about itself—the hop count (<hop>) is initialized to zero, the source node ID (<node>) to its own ID ("1"), the sensor type (<sensor>) to R (symbolic of RFID reader), the location (<location>) to the location of the node (in this case "A", symbolic of the only location in the network), and the list of shortest path nodes to empty. The other nodes are similarly appropriately set as shown.

Referring again to FIG. 6, the hop_table broadcasting function 614 operates to broadcast the local hop table 230 every time the table has been updated, so that all nodes in the network can merge the new updates with their tables (Appendix, lines 24-27).

The neighbor node change updating process 616 checks for new or removed nodes in order to update the local hop table 230. If a node 110 detects a new neighboring node, for example a node 110x, it initializes the new node 110x by spawning the cluster formation algorithm 140 and sending it all the cluster rules 210 and behavior scripts 230 stored in its memory, thus enabling the new node 110x to join a cluster (Appendix, lines 30-31). If a node detects that a neighboring node 110x has disappeared, it deletes all the entries in its local hop table 220 that correspond to that node 110x, as well as all references to that node 110x in the list_of_shortest_path_nodes lists of all the remaining hop table entries (Appendix, lines 32-36).

The clustering process 618 formulates clusters. To do this, the clustering process 618 matches the sensor rules 212 with the hop table information. For each sensor rule 212, the clustering process 618 executing locally at a node searches its local hop table 230 and locates all the nodes that have the sensor types and location that match the rule 212. The clustering process 618 groups the located nodes by sensor type and location, and calls the master selection function 240 to compute the master node (Appendix, lines 38-44). Information about the sensor group formed is stored in the cluster formation 260. For example, in the system 700 of FIG. 7, suppose there are two sensor rules: Rule 1=<RFID> <door A> <dock-door> and Rule 2=<camera> <door A> <dock-door>. Assuming that the master selection function 240 selects the node ID with the smallest number, then the cluster output would be as shown in the following table:

| <virtual_sensor_type> | <sensor_type> | <location> | <master> | <members> |
|---|---|---|---|---|
| dock-door> | R | A | 1 | 1,2 |
| dock-door> | C | A | 4 | 4,5,6 |

Returning to FIG. 6, the aperiodic task 620 performs two operations, including a) adding or deleting hop table entries to merge a neighbor's table with the local hop table (table merging function 622) and b) updating the hop count and the list_of_shortest_path_nodes (hop count update process 624).

The two aperiodic operations are performed when a packet with a neighbor's hop_table is received. The table merging function 622 compares a neighboring node's hop_table with the local node's hop_table and determines whether to add or to delete entries in the local hop_table. Because hop_tables propagate from node to node, intermediate nodes may have inconsistent tables from neighbors at different times: one neighbor's table may show entries for new sensors, while another neighbor's table may not show those entries yet. Thus a node needs to have a way to distinguish between new and stale information in order to avoid oscillations between new and old data. In one embodiment, information coming from neighboring nodes that are in a shortest path to the source node is considered more reliable than information from other neighboring nodes in longer paths. Neighboring nodes in the shortest paths to the source node are trusted more because they are more likely to get the latest updates about the source node. By prioritizing the flow of information to travel along the nodes in the shortest paths, the flow of stale data is contained and oscillations are more quickly dampened.

Before adding a new sensor entry that appears in the neighbor's table to the local hop_table, the table merging function 622 of the local node checks whether its own node id is in the list_of_shortest_path_nodes of the entry in the neighbor's table. If it is, then table merging function 622 does not add the new entry to the local hop_table because the node itself was in the shortest path—therefore, it is more likely that the entry was recently deleted from the local node's hop_table, and that the neighbor node's hop_table has not been updated yet (which will occur through the node itself, Appendix, lines 49-54). If the node is not in the neighbor's list_of_shortest_path_nodes, the node adds the entry to its local hop_table, since it does not have information that contradicts its neighbor.

Figure 8:
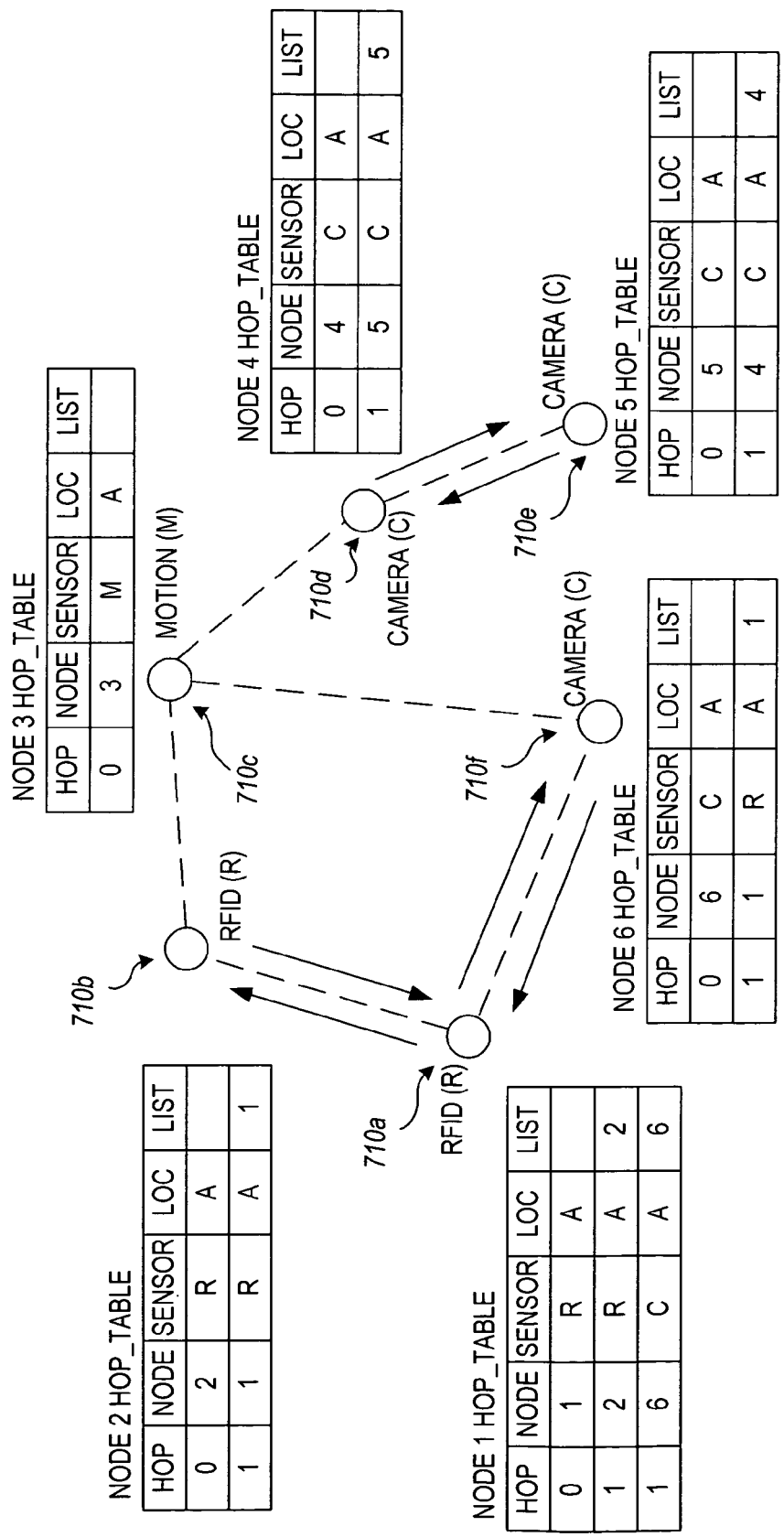
FIG. 8 is the network diagram of FIG. 7 after a first exchange of hop tables.

Before deleting a sensor entry because it does not appear in the neighbor's table, the table merging function 622 of the local node checks whether the neighbor's node id is in the list_of_shortest_path_nodes of the entry in its local hop_table. If it is, then it trusts the neighbor's information because the neighbor is in the shortest path. Therefore, the table merging function 622 of the local node deletes the entry. Otherwise, the table merging function 622 of the local node keeps the old entry (Appendix, lines 56-62). FIG. 8 shows the state of the hop tables of the nodes 710a, 710b, 710c, 710d, 710e, 710f of the system 700 of FIG. 7 after a hop table exchange between node 1 (710a) and node 2 (710b), node 1 (710a) and 6 (710f), and node 4 (710d) and 5 (710e). As shown in the updated hop tables 720a, 720b, 720c, 710d, 720e, 720f all the nodes receive brand new information from neighbors—therefore, there are no shortest path lists to check yet.

Figure 9:
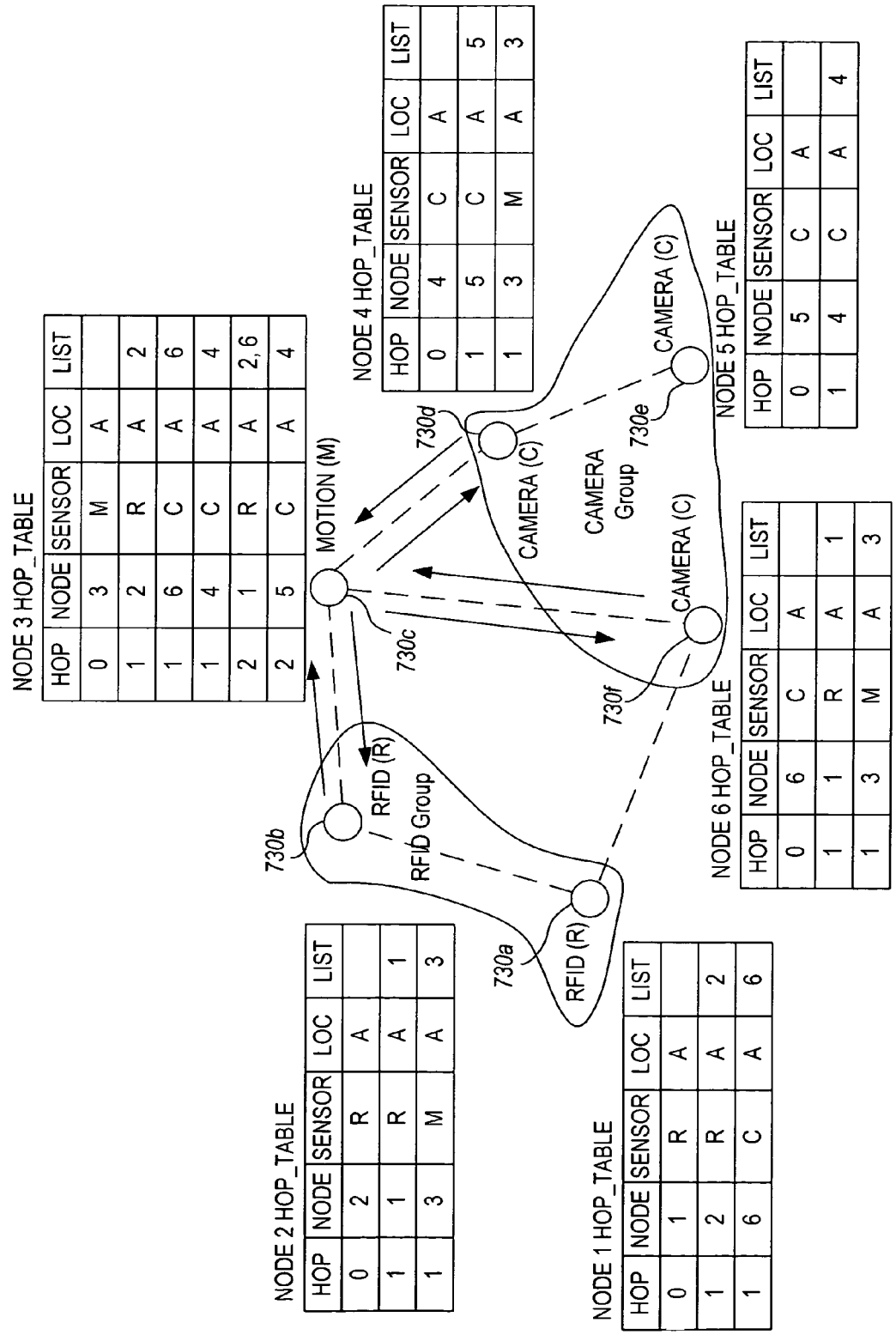
FIG. 9 is the network diagram of FIGS. 7 and 8 after another exchange of hop tables.

FIG. 9 shows the hop tables after a second exchange between node 2 (710b) and node 3 (710c), node 6 (710f) and node 3 (710c), and node 3 (710c) and node 4 (710d). In this scenario, node 3 (710c) receives inconsistent tables from node 2 (or 6) and 4, and must decide whether to add or delete entries based on the criteria given above for merging tables.

The hop count update process 624 updates the hop count and the list_of_shortest_path_nodes. When a node receives a hop_table from a neighbor, it performs the following operations for each entry on the table: it increments by one the hop_count in the neighbor's table and compares it with its own hop_count of the equivalent entry. If the incremented hop count is smaller then the node's current hop count, the smaller hop count replaces the current hop count, and the list_of_shortest_path_nodes is replaced with the neighbor's node id. If, however, the incremented hop count is the same as the node's hop count, the neighbor's node id is appended to the list_of_shortest_path_nodes in the table (Appendix, lines 64-74).

During execution of the cluster formation algorithm 140, if there is a match for a given local sensor 130, the appropriate behavior script 230 for the local sensor 130 for the cluster is spawned. Furthermore, nodes 110 that have the same sensor type 132 and location 134 form a group and select a master. Because there could be more than one sensor 130 of the same type 132 in a cluster, the master selection function 240 for each sensor type 132 is preferably executed before the ancestor rules 214 are applied to avoid many-to-many messages.

Figure 10:
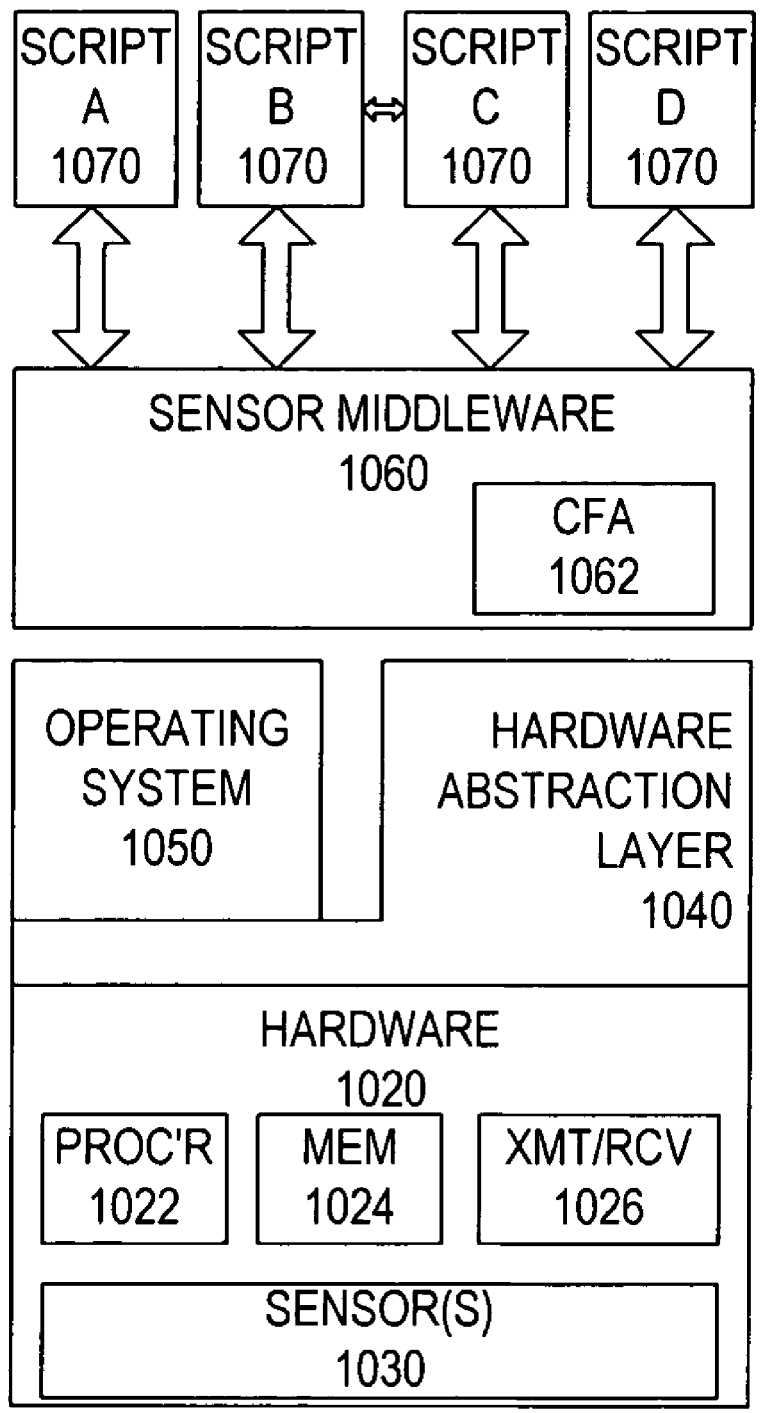
FIG. 10 is a block diagram of an embodiment of a sensor system node.

FIG. 10 is a block diagram of an embodiment of a sensor system node 1000. The node 1000 includes hardware 1020, which includes a processor 1022 for executing programming instructions, a memory 1024 for storing programs and data, a communications interface 1026 for transmitting information to, and receiving information from, other neighboring nodes (not shown). The hardware also includes one or more sensors 1030. A hardware abstraction layer 1040 may be implemented to allow an operating system 1050 and sensor middleware 1060 to interface with the hardware without requiring the operating system 1050 or middleware 1060 to know the implementation details of the underlying hardware 1020. In one embodiment, the middleware 1060 is implemented with sensor middleware known as "Sensorware". SensorWare is an Open Source software package (available on the Internet at www.sourceforge.net) that abstracts the run-time environment of a sensor node using a set of services, supports a scripting language (an extension of TCL) to form scripts out of these services, and supports scripting mobility (i.e., spawning). These scripts perform certain tasks when executing in a node.

In one embodiment, a cluster formation algorithm 200 is implemented as a TCL application script 1062 in Sensorware. The Sensorware cluster formation algorithm 1062 uses information about the local node's resources (e.g. scripts 1070 running) and node's sensing attributes (e.g., sensor types, location) for two purposes: 1) to disseminate the cluster rules and behavior scripts to nodes similarly executing the cluster formation algorithm 200, and 2) to build the hop tables. Dissemination of the cluster rules and behavior scripts requires a form of attribute-addressing to address nodes by node attributes. In particular, sensor nodes are addressed by the "virtual sensor type" they belong to and by the "set of attributes" (e.g. sensor types, location) they have. For example to send a message to all the "dock-door" virtual sensors that have RFID readers and are in location A, the specified address would contain the following information: <"dock_door", attributes (rfid, location A)>.

Building hop tables requires a mechanism to set and query attributes. The following table has a description of how this attribute addressing is used using Sensorware language.

| New commands | Description |
| --- | --- |
| send attribute sensorType=RFID !virtualSensorType=dock_door !location=north | This sends a message with <data> to all nodes that have an RFID reader, and are in the "north" location. If the node is running a script with name "dock_door", the message is directed to this script. |
| act attribute -as <attr_name> =<attr_value> | This adds a system attribute with a name and value, i.e. sensortype=RFID |
| act attribute -a <attr_name> = <attr_value> | This adds a script attribute with a name and value. A script would use this command to set its name as an attribute, i.e. scriptName=RFID_script |
| query attribute -s | This will return the list of system attributes of the node |
| query attribute -s <attribute-name> | This will return the value of the attribute in <attribute-name> |

In one embodiment, attributes are classified into two classes, a script attribute and a system attribute. A script attribute describes script characteristics, for example, its name. A system attribute describes node resources, for example, sensor types. Attributes are specified using the following syntax: [attr_name=[val,]*!]*, which describes attribute-value pairs. The ";" separates multiple values of the same attribute, "!" separates multiple attributes, and "*" means one or more of the elements in brackets ([ ]).

The act and the query commands can set and query attributes. Naturally, before attributes can be used, they have to be initialized (with the act command). Attributes are initialized by device drivers in Sensorware when new attached sensors are detected (e.g. act attribute–as sensortype=RFID), or by application scripts, for example, the attribute "virtualSensorType=dock_door" is initialized by the clustering algorithm when it receives the sensor rules to form a "dock door" virtual sensor and finds a match between the nodes attributes and the sensor rules.

The send command creates the packet header with the given attributes as destination addresses, and floods the packet to the network. When a node receives a message, it compares its system attributes with the message's; if there is a match, it dispatches the message to the scripts with the matching script attribute (e.g. script name).

Sensor Initialization can be divided into two parts: "hard" and "soft" initialization. Hard initialization is the initialization of the hardware resources on the sensor node—typically the sensor instrumentation. "Soft" initialization, on the other hand, refers to initialization of logical attributes with the attribute device. Principal among these, for cluster formation, are the sensor location. In one embodiment, each sensor node in a sensor network system is equipped with a RFID reader. During deployment, a RFID tag representing a symbolic location in the environment is passed near the RFID reader of each sensor to be grouped. For example, a user might choose to pass RFID tag "A" past the sensors on warehouse dock-door "A", and RFID tag "B" past the sensors on dock-door "B". The Sensorware attribute device can then be used to target messages to individual dock-doors by specifying "LocationTag=A" or "LocationTag=B" in the device address. This attribute is used by both the hop table management and the sensor behavior scripts.

Figure 11:
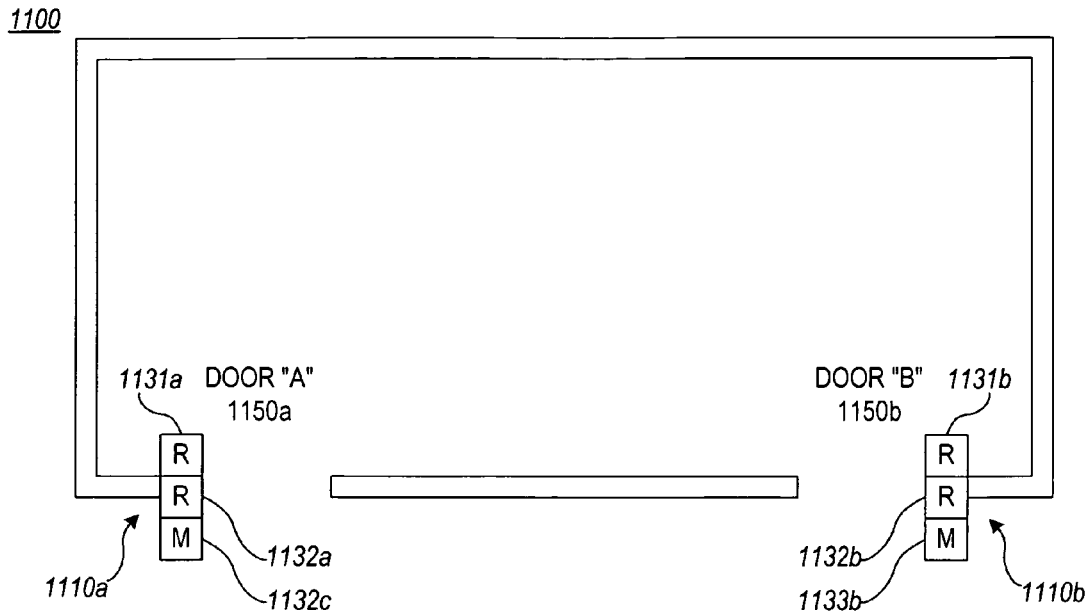
FIG. 11 illustrates an embodiment of a pallet tracking system for a warehouse.

Turning now to an example application, FIG. 11 shows an embodiment of a system deployed to automate the programming of RFID pallet tracking systems for warehouses. Current systems use a motion sensor and one or more RFID readers at each door to detect and read RFID tags from pallets passing through the door. These systems are replacing bar code methods to speed inventory tracking in the supply chain. Currently, deploying these systems is labor intensive and time consuming, making deployment costly. The RFID readers and motion sensors are typically connected to a wired LAN network, which requires manual wiring and network setup, and a middleware software that controls the sensors is programmed by a trained technician. The deployment process may be simplified in one embodiment by replacing these systems with a wireless network of motion and RFID reader nodes and applying a cluster formation algorithm according to an embodiment of the invention to automate the process of sensor configuration and programming. This process includes sending to each node in the sensor network the rules describing the sensor types (e.g. motion sensor and RFID readers), the location of the doors where these sensors should form a "dock-door" cluster, and the behavior scripts for each sensor type. The scripts execute the appropriate operations on the appropriate nodes to detect and read the pallet tags.

For example, FIG. 11 illustrates a system 1100 which includes four RFID readers 1131a, 1131b, 1132a, 1132b and two motion sensors 1133a, 1133b. The system 1100 may be programmed to operate as two sets of RFID door systems, each RFID door system comprising two RFID readers and one motion sensor. In one embodiment, each of the sensor nodes 1110a, 1110b consists of an Intrinsyc Cerfcube 255 Xscale platform with an external PIC controller board to interface with arbitrary sensors, a wireless 802.11 radio and a short distance RFID reader 1131a, 1131b. The RFID readers used in these application are required to cover large areas, so we use long range readers 1132a, 1132b, whose frequency band (approximately 915 Mhz) do not interfere with the short distance RFID readers 1131a, 1131b. A first behavior script may be written and associated with the motion sensor 1133a, 1133b of each RFID door system, and a second behavior script may be written and associated with each of the RFID readers of each RFID door system.

In the example of FIG. 11, the location of the nodes 1110a, 1110b is initialized as follows. An RFID tag is waved in front of the short distance RFID reader 1131a, 1131b of each node 1110a, 1110b to assign the symbolic location "A" to node 1110a at door A 1150a and "B" to node 1110b at door B 1150b. After the location is assigned, the system 1100 is ready to be programmed.

Two sets of sensor rules are sent, one set to form an RFID "door" system at location "A" and another at location "B". The set of sensor rules for location "A" is: [RFID A 1 (RFID sensor rule) and motion A 1 (motion sensor rule)], and for location "B": [RFID B 2 (RFID sensor rule) and motion B 2] (motion sensor rule).

Next, the behavior scripts are sent to all nodes 1110*a*, 1110*b*. The RFID script can be summarized as follows: it periodically checks its status as a master or slave by requesting this information from the clustering algorithm. The script may use the query_master and query_members APIs presented earlier to get this information. If an RFID reader 1131 is a master, it also obtains the list of slaves in its sensor group, as well as information on other sensor types (e.g. motion sensor 1133) in the cluster. If the motion sensor 1133 is present, the master reader 1131 waits for the motion sensor to notify it of the presence of a pallet. Otherwise, the RFID reader 1131 schedules the read times of each slave and sends each one a message commanding them to read one at a time, in a continuous cycle. The motion sensor script is simpler since the application assumes there is only one motion sensor per door 1150*a*, 1150*b*. The motion sensor 1133 waits for a pallet to be detected and then notifies the master RFID reader of the presence of the pallet. The motion sensor 1133 may obtain the node id of the master RFID reader 1131 by querying the algorithm using the query_ancestor API, described earlier.

Figure 12:
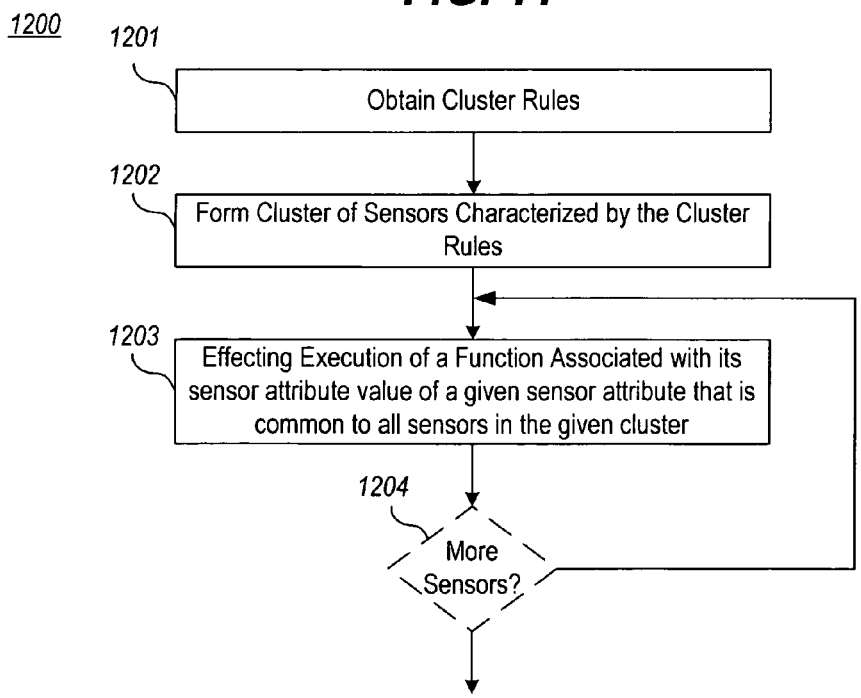
FIG. 12 is a flowchart illustrating an embodiment of a method for programming clusters of collaborative sensors based on sensor attributes and locations.

FIG. 12 is a flowchart illustrating an embodiment of a method for programming clusters of collaborative sensors based on sensor attributes and locations. The method 1200 includes a step of obtaining a set of cluster rules defining formation of a cluster, each cluster rule defining a set of cluster membership attributes and corresponding cluster membership attribute values required of a sensor for membership in the cluster (step 1201); forming a given cluster comprising the sensors characterized by the sensor attributes with corresponding sensor attribute values specified by at least one of the cluster rules (step 1202); and for at least one sensor of the given cluster, effecting execution of a respective function associated with its sensor attribute value of a given sensor attribute that is common to all sensors in the given cluster (step 1203). The method 1200 may further include the step of performing each of steps 1201 through 1203 at each sensor node in the sensor network (step 1204).

Those of skill in the art will appreciate that the embodiments of the methods and apparatuses described and illustrated herein may be implemented in software, firmware or hardware, or any suitable combination thereof. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Although this preferred embodiment of the present invention has been disclosed for illustrative purposes, those skilled in the art will appreciate that various modifications, additions and substitutions are possible, without departing from the scope and spirit of the invention as disclosed in the accompanying claims.

APPENDIX

```
/* REQUIRES: cluster rules and behaviors scripts stored in nodes */
PERIODICALLY:
/* Check changes in local sensors */
FOR each new sensor attached DO
    add sensor to hop_table
    spawn behavior script if sensor type and node's location match a
```

APPENDIX-continued

```
    rule
ENDFOR
FOR each removed sensor DO
    kill behavior script of sensor
    delete sensor from hop_table
ENDFOR
/* Check changes in location */
IF node's location changed THEN
    kill all behavior scripts
    FOR each sensor DO
        update location
        spawn behavior script if sensor type and node's location
        match a rule
    ENDFOR
ENDIF
/* Check change in hop_table */
IF hop_table changed THEN
    Broadcast it to neighbors
ENDIF
/* Check changes in neighbors */
IF new neighbor THEN
    send rules, behavior scripts and hop_table
ELSIF neighbor disappeared THEN
    delete neighbor from hop_table
        delete references to neighbor from all
        list_of_shortest_path_nodes lists
ENDIF
/* Find clusters */
FOR each rule in rules_table
    group all sensors whose sensor type and node location match rule
    call master selection function
    store cluster information (master, members, location and
    virtual_sensor_type)
ENDFOR
ON RECEIVING a neighbor's hop_table:
/* Compare neighbor's table with local node's hop_table */
/* Before adding a new entry */
FOR each entry in neighbor's hop_table DO
    IF local node is NOT in
        entry.list_of_shortest_path_nodes THEN
        add entry to local node's hop_table
    ENDIF
ENDFOR
/* Before deleting an entry */
FOR each entry that is not in neighbor's hop_table DO
    IF neighbor is in local node's
        entry.list_of_shortest_path_nodes THEN
        delete entry from local node's hop_table
    ENDIF
ENDFOR
/* Update hop count and list_of_shortest_path_nodes */
FOR each shared entry in both neighbor's and local node's hop_table DO
    incr neighbor.entry.hop by 1
    IF neighbor.entry.hop < node.entry.hop THEN
        replace node.entry.list_of_shortest_path_nodes with neighbor
        node id
    ELSIF neighbor.entry.hop == node.entry.hop
        append neighbor node id to
        node.entry.list_of_shortest_path_nodes
    ENDIF
ENDFOR
```

What is claimed is:

1. A sensor node for operation in a sensor network, comprising:
   a plurality of sensors each characterized by associated sensor attributes;
   a memory storing computer code defining a set of cluster rules defining formation of a cluster, each cluster rule defining a set of cluster membership attributes and corresponding cluster membership attribute values required of each of the plurality of sensors for membership in the cluster and computer code defining a cluster formation function is configured to form a given cluster comprising the sensors characterized by the sensor attributes with corresponding sensor attribute values specified by at least one of the cluster rules and wherein the cluster formation function is further configured to program at least one of the plurality of sensors of the given cluster to perform a respective function associated with its sensor attribute value of a given sensor attribute that is common to all sensors in the given cluster; and a processor for executing the computer code stored in the memory, wherein the plurality of sensors and the processor are connected to a network and addressed as a single entity.

2. The sensor node of claim 1, wherein the processor is configured to execute the computer code defining the cluster formation function to program all sensors of the given cluster to perform respective functions based on their respective sensor attribute values of the given sensor attribute.

3. The sensor node of claim 1, wherein the processor is configured to execute the computer code defining the cluster formation function to obtain a behavior script configured to implement the respective function associated with the sensor attribute value of the given sensor attribute of the at least one sensor of the plurality of sensors, and to spawn execution of the behavior script such that the respective at least one sensor performs the respective function.

4. The sensor node of claim 3, wherein the processor is configured to execute the computer code defining the cluster formation function to send the obtained behavior script to the respective at least one sensor of the plurality of sensors and to spawn execution of the behavior script at the respective sensor.

5. The sensor node of claim 1, wherein the given sensor attribute that is common to all sensors in the given cluster comprises a sensor type.

6. The sensor node of claim 1, wherein the memory further stores computer code for one or more ancestor rules associated with the given cluster, each of which specifies at least one of a sensor of the plurality of sensors having a sensor attribute value of the given sensor attribute, and at least one of a source sensor that is a member of the given cluster from which the specified at least one sensor receives data and a destination sensor that is a member of the given cluster to which the specified at least one sensor sends data.

7. The sensor node of claim 1, wherein the memory further stores computer code for a grouping function configured to assign a sensor in the given cluster to a sensor group, wherein the sensor group comprises only sensors in the sensor network that are members of the given cluster and are characterized by a same sensor attribute value of the given sensor attribute.

8. The sensor node of claim 7, wherein the memory further stores computer code for one or more ancestor rules associated with the given cluster, each of which specifies at least one sensor group comprising sensors of the given cluster having a first corresponding same sensor attribute value of the given sensor attribute, and at least one of a source sensor group comprising sensors of the given cluster having a second corresponding same sensor attribute value of the given sensor attribute from which sensors in the specified sensor group receive data and a destination sensor group comprising sensors of the given cluster having a third corresponding same sensor attribute value of the given sensor attribute to which sensors in the specified sensor group send data.

9. The sensor node of claim 7, wherein the memory further stores computer code for a master selection function configured to select a single master sensor in a sensor group, wherein the single master sensor coordinates data collection from sensors belonging to the sensor group and communication to and from sensors outside the sensor group.

10. The sensor node of claim 9, wherein the memory further stores computer code for one or more ancestor rules associated with the given cluster, each of which specifies at least one sensor group comprising sensors of the given cluster having a first corresponding same sensor attribute value of the given sensor attribute, and at least one of a source sensor group comprising sensors of the given cluster having a second corresponding same sensor attribute value of the given sensor attribute from which the selected master sensor in the specified sensor group receives data and a destination sensor group comprising sensors of the given cluster having a third corresponding same sensor attribute value of the given sensor attribute to which the selected master sensor in the specified sensor group sends data.

11. A computer-readable medium on which is stored one or more computer programs comprising a set of instructions executable by a processor for implementing a method for programming clusters of collaborative sensors in a sensor network of nodes, each node comprising processing means and a plurality of sensors each characterized by associated sensor attributes, wherein the processing means and the plurality of sensors are connected to a network and addressed as a single entity, the one or more computer programs comprising instructions for:

obtaining a set of cluster rules defining formation of a cluster in each of the nodes, each cluster rule defining a set of cluster membership attributes and corresponding cluster membership attribute values required of a sensor for membership in the cluster;

forming a given cluster comprising the sensors characterized by the sensor attributes with corresponding sensor attribute values specified by at least one of the cluster rules; and programming at least one of the plurality of sensors of the given cluster to perform a respective function associated with its sensor attribute value of a given sensor attribute that is common to all sensors in the given cluster.

12. The computer-readable medium of claim 11, said one or more computer one or more computer programs further comprising instructions for:

obtaining a behavior script which implements the respective function associated with the sensor attribute value of the given sensor attribute of the at least one sensor of the plurality of sensors, and spawns execution of the behavior script such that the respective at least one sensor performs the respective function.

13. The computer-readable medium of claim 12, said one or more computer one or more computer programs further comprising instructions for:

sending the obtained behavior script to the respective at least one sensor and spawns execution of the behavior script at the respective sensor.

14. The computer-readable medium of claim 11, said one or more computer one or more computer programs further comprising instructions for:

forming sensor groups each comprising one or more sensors each characterized by a common sensor type.

15. The computer-readable medium of claim 11, said one or more computer one or more computer programs further comprising instructions for:

establishing an hierarchy between sensor groups in the given cluster.

16. The computer-readable medium of claim 11, said one or more computer one or more computer programs further comprising instructions for:

forming one or more sensor groups by assigning a sensor in the given cluster to a sensor group which comprises only sensors in the sensor network that are members of the given cluster and which are characterized by a same sensor attribute value of the given sensor attribute.

17. The computer-readable medium of claim 16, said one or more computer one or more computer programs further comprising instructions for:

specifying at least one sensor group comprising sensors of the given cluster having a first corresponding same sensor attribute value of the given sensor attribute, and at least one of a source sensor group comprising sensors of the given cluster having a second corresponding same sensor attribute value of the given sensor attribute from which sensors in the specified sensor group receive data and a destination sensor group comprising sensors of the given cluster having a third corresponding same sensor attribute value of the given sensor attribute to which sensors in the specified sensor group send data.

18. The computer-readable medium of claim 16, said one or more computer one or more computer programs further comprising instructions for:

selecting a single master sensor in a sensor group which coordinates data collection from sensors belonging to the sensor group and communication to and from sensors outside the sensor group.

19. The computer-readable medium of claim 18, said one or more computer one or more computer programs further comprising instructions for:

specifying at least one sensor group comprising sensors of the given cluster having a first corresponding same sensor attribute value of the given sensor attribute, and at least one of a source sensor group comprising sensors of the given cluster having a second corresponding same sensor attribute value of the given sensor attribute from which the selected master sensor in the specified sensor group receives data and a destination sensor group comprising sensors of the given cluster having a third corresponding same sensor attribute value of the given sensor attribute to which the selected master sensor in the specified sensor group sends data.

20. A sensor network system, comprising:

at least one sensor node, each sensor node comprising:

a plurality of sensors each having associated sensor attributes;

a memory storing computer code defining a set of cluster rules defining formation of a cluster, each cluster rule defining a set of cluster membership attributes and corresponding cluster membership attribute values required of a sensor for membership to the cluster;

said memory further storing computer code defining a cluster formation function configured to form a given cluster in accordance with the set of cluster rules to include as cluster members of the given cluster each of the one or more sensors having sensor attributes and corresponding sensor attribute values that match the set of cluster membership attributes and corresponding predefined cluster attribute values defined by any of the cluster rules in the set of cluster rules;

said memory further storing computer code defining a set of behavior scripts, each associated with a different cluster membership attribute value of one of the cluster membership attributes that is common to all member sensors of the given cluster, wherein the set of behavior scripts is configured to program at least one of the plurality of sensors of the given cluster to perform a respective function associated with its sensor attribute value of a given sensor attribute that is common to all sensors in the given cluster;

said memory further storing computer code defining a behavior spawning function which, for each sensor in the given cluster, effects execution of the behavior script associated with the cluster membership attribute value specific to sensor attribute value of the corresponding sensor attribute of the sensor;

said memory further storing computer code defining a hop table which stores information concerning sensor types and corresponding host node information of sensors in the sensor network;

said memory further storing computer code defining a hop table updating function which detects changes in nodes of the sensor network and updates the information in the hop table to reflect the detected changes; and a processor for executing the computer code stored in the memory, wherein the plurality of sensors and the processor are connected to a network and addressed as a single entity.

* * * * *

UNITED STATES PATENT AND TRADEMARK OFFICE
CERTIFICATE OF CORRECTION

PATENT NO. : 7,937,167 B1
APPLICATION NO. : 11/503598
DATED : May 3, 2011
INVENTOR(S) : Malena Mesarina et al.

Page 1 of 1

It is certified that error appears in the above-identified patent and that said Letters Patent is hereby corrected as shown below:

In column 16, line 39, in Claim 12, after "computer" delete "one or more computer".
In column 16, line 48, in Claim 13, after "computer" delete "one or more computer".
In column 16, line 54, in Claim 14, after "computer" delete "one or more computer".
In column 16, line 59, in Claim 15, after "computer" delete "one or more computer".
In column 16, line 64, in Claim 16, after "computer" delete "one or more computer".
In column 17, line 5, in Claim 17, after "computer" delete "one or more computer".
In column 17, line 20, in Claim 18, after "computer" delete "one or more computer".
In column 17, line 27, in Claim 19, after "computer" delete "one or more computer".

Signed and Sealed this
Twenty-seventh Day of December, 2011

David J. Kappos
*Director of the United States Patent and Trademark Office*